Patented June 10, 1941

2,245,183

UNITED STATES PATENT OFFICE 2,245,183

PRODUCTION OF OLEFIN OXIDES BY CATALYTIC OXIDATION OF OLEFINS

Bruno Christ, Heinz Pardon, and Fritz Hanusch, Ludwigshafen-on-the-Rhine, Germany, assignors, by mesne assignments, to General Aniline & Film Corporation, New York, N. Y., a corporation of Delaware No Drawing. Application May 27, 1939, Serial No. 276,226. In Germany June 4, 1938

6 Claims. (Cl. 260—348)

The present invention relates to the production of olefin oxides by catalytic oxidation of olefins.

It has already been proposed to obtain olefin oxides catalytically by the treatment of olefins with oxygen or gases containing oxygen at elevated temperatures. As catalysts there have been proposed for example silver and silver alloys which have been brought into a finely divided form mechanically. Poor yields of olefin oxides are obtained with such catalysts.

We have now found that olefin oxides are obtained in better yields than hitherto by carrying out the oxidation of olefins, in particular low molecular olefins, in the presence of silver catalysts which have been obtained by treating dissolved or suspended silver compounds with reducing agents in the presence of substances having a dispersing action.

Suitable substances having a dispersing action are not only the usual capillary-active dispersing agents, such as alkylnaphthalene sulphonic acid salts, fatty alcohol sulphonates and high molecular weight quaternary ammonium compounds, but also the known protective colloids, as for example gum arabic, gelatine or colloidal solutions of metal oxides and hydroxides.

The preparation of the catalysts may be carried out by adding a dispersing agent to a solution of a silver salt and then adding a reducing agent, as for example hydrazine, phenylhydrazine, formaldehyde, glucose, hydroxylamine or other compounds which are capable of converting silver compounds into metallic silver. The procedure may also be that from a silver salt solution to which a dispersing agent has been added the silver is first precipitated in the form of an insoluble compound in a finely divided state and then adding to this fine suspension a reducing agent which effects the formation of the free silver. Furthermore a silver compound which has not been obtained by precipitation may be brought into a finely divided form, for example by fine grinding, if desired in the presence of a dispersing agent, and a suspension prepared from this silver compound, if necessary after the addition of a dispersing agent, then converted into silver.

In addition to pure silver catalysts, catalysts are also suitable which contain not only silver but also other metals or metal compounds having an activating action. Among these may be mentioned in particular copper, gold, iron and manganese and mixtures of these metals. The preparation of the activated catalysts may also be effected in the above-mentioned manner with the difference that solutions or suspension of the silver compounds in admixture with the other metal compounds are used which are reduced or precipitated by the addition of the reducing agent.

The metal powders obtained are separated in the usual manner, purified by washing and if desired also etched superficially with dilute nitric acid. They may if desired be shaped into pills with the aid of organic adhesives or applied to carriers.

The reaction conditions for the olefin oxidation may be the same as are used in the method hitherto usual. The most suitable temperatures usually lie between 150° and 500° C., preferably between 200° and 450° C. In many cases it is preferable to work under pressure, as for example at 5 or 20 atmospheres or more. The oxidation of ethylene may be carried out for example by leading a mixture of air and ethylene while using an excess of air and, in order to avoid explosions, preferably with an addition of water vapor, over the silver catalyst at from 200° to 300° C. The ethylene may also be used in excess, the ethylene oxide then being obtained in specially high concentration. Since relatively low temperatures may be used with the new catalysts, the latter are protected and retain a uniformly good activity for long periods.

The oxidation may also be carried out in a multi-stage or cyclic process by re-supplying the unconverted ethylene to the reaction after separation of the ethylene oxide formed and the carbon dioxide formed almost exclusively as a bye-product.

The following examples will further illustrate how this invention may be carried out in practice but the invention is not restricted to these examples. The parts are by weight unless otherwise stated.

*Example 1*

An aqueous solution of 1.6 parts of gum arabic in 80 parts of water is added to a solution of 474 parts of silver nitrate in 6000 parts of water. A solution containing 285 parts of hydrazine hydrate is then added, the whole being cooled with ice water. The precipitate formed is filtered off by suction, carefully freed from dispersing agent by washing, treated for a short time with dilute nitric acid, washed free from nitrate ions, dried and shaped into pills with the aid of 10 per cent gum arabic solution.

A mixture of equal parts of air and steam is led over the resulting catalyst at about 300° C. until the binding agent has been removed. The pills are then charged into a silver tube capable of being heated. There is then led per hour over the catalyst a mixture of 58.5 grams of ethylene, 23 grams of air and 60 grams of steam at a temperature of from 200° to 300° C. at a speed of 140 liters (at 0° C. and 760 millimeters) total amount of gas per hour per 100 cubic centimeters of catalyst. The final gas contains a uniform concentration of about 2.5 per cent of ethylene oxide even after operation for long periods. The yield is from 50 to 70 per cent with reference to converted ethylene.

If a mixture of 235 grams of air, 23.5 grams of ethylene and 200 grams of steam be led at about 300° C. at a speed of 250 liters (at 0° C. and 760 millimeters) per hour per 100 cubic centimeters of catalyst over the same catalyst, about the same concentration of ethylene oxide in the final gas and about the same yield with reference to converted ethylene are obtained as with the above-mentioned gas mixture.

A catalyst of the same activity is obtained by using a solution of 13 parts of dextrine in 150 parts of water instead of the said gum arabic solution, the other conditions of preparation being the same.

Example 2

7 parts of oleic acid are vigorously stirred with 100 parts of water and then 15 parts of 25 per cent ammonia solution are added. After the solution has become clear, 400 parts of water and 285 parts of hydrazine hydrate are added.

This mixture is allowed to flow into a solution of 474 parts of silver nitrate and 2.1 parts of copper nitrate in 6000 parts of water. At the same time, a solution of 1.5 parts of gold chloride in 500 parts of water are allowed to flow in so rapidly that both solutions have completely flowed into the silver nitrate-copper nitrate solution in the same time. The metal powder precipitated is filtered off by suction, washed out, dried and pressed into pills with the aid of dextrine as the binding agent. The pills are treated at from 270 to 300° C. with equal parts of air and steam to remove adherent organic substance, introduced into 10 per cent nitric acid and allowed to remain therein for some minutes while stirring, filtered off by suction, washed and dried.

If a mixture of 58.5 grams of ethylene, 23 grams of air and 60 grams of steam be led at a speed of 140 liters (at 0° and 760 millimeters) per hour per 100 cubic centimeters of catalyst over the said catalyst, there are obtained at 200° C. about 3 per cent of ethylene oxide in the final gas, the yield being from 70 to 80 per cent with reference to converted ethylene. At lower temperatures, as for example at about 180° C., almost the whole of the converted ethylene is present in the final gas as ethylene oxide.

Example 3

The following solutions are employed for the preparation of the catalyst:

*Solution I.*—474 parts of silver nitrate and 2.1 parts of copper nitrate are dissolved in 6000 parts of water.

*Solution II.*—1.5 parts of gold chloride are dissolved in 500 parts of water.

*Solution III.*—329 parts of potassium hydroxide are dissolved in 1000 parts of water.

*Solution IV.*—Aqueous potassium hydroxide solution is added to a mixture of 7 parts of oleic acid and 200 parts of water until a clear solution is obtained. 250 parts of an aqueous 30 per cent solution of formaldehyde and 500 parts of water are then added.

Solutions II, III and IV are allowed to slowly flow into Solution I, while stirring and maintaining the temperature below 20° C., the speed of flow being so chosen that the flowing in of all solutions is simultaneously finished. The mixture obtained is stirred for a further hour, the precipitate formed filtered off by suction, washed with water until it is free from alkali, treated for a new minutes with 2 per cent nitric acid, washed free from nitrate ions and dried.

The metal powder is made into a paste with a 10 per cent solution of cellulose acetate in ethyl acetate and shaped into pills. These pills are dried and exposed to a mixture of equal volumes of air and steam at 300° C. until all organic constituents are removed.

The pills are then charged into a silver tube surrounded by a bath kept at from 200 to 230° C. There is then led per hour over 1 part by volume of the pills a mixture of 1000 parts by volume of air and 35 parts by volume of ethylene. The ethylene is completely converted, from 60 to 80 per cent giving ethylene oxide, the residue forming carbon dioxide. The catalyst retains a uniform activity for a long period.

Similar results are obtained if a pure silver catalyst be used. Such a catalyst may be prepared in the manner described above while omitting the copper nitrate in Solution I and omitting Solution II completely.

What we claim is:

1. In the production of olefin oxides by catalytic oxidation of low molecular olefins in the gaseous phase with gases comprising oxygen the step which consists in carrying out the oxidation in the presence of metallic silver catalysts which have been precipitated in the form of non-colloidal metallic particles by reducing silver compounds in the liquid phase in the presence of substances having a dispersing action.

2. In the production of olefin oxides by catalytic oxidation of low molecular olefins in the gaseous phase with gases comprising oxygen the step which consists in carrying out the oxidation in the presence of metallic silver catalysts which have been precipitated in the form of non-colloidal metallic particles by reducing silver compounds in the presence of other metal compounds in the liquid phase in the presence of substances having a dispersing action.

3. In the production of olefin oxides by catalytic oxidation of low molecular olefins in the gaseous phase with gases comprising oxygen the step which consists in carrying out the oxidation in the presence of metallic silver catalysts which have been precipitated in the form of non-colloidal metallic particles by reducing silver compounds in the presence of a compound of at least one metal selected from the group consisting of gold, copper, iron and manganese in the liquid phase in the presence of substances having a dispersing action.

4. In the production of ethylene oxide by catalytic oxidation of ethylene in the gaseous phase with gases comprising oxygen the step which consists in carrying out the oxidation in the presence of metallic silver catalysts which have been precipitated in the form of non-colloidal metallic particles by reducing silver compounds in the liquid phase in the presence of substances having a dispersing action.

5. In the production of ethylene oxide by catalytic oxidation of ethylene in the gaseous phase with gases comprising oxygen the step which consists in carrying out the oxidation in the presence of metallic silver catalysts which have been precipitated in the form of non-colloidal metallic particles by reducing silver compounds in the presence of a compound of at least one metal selected from the group consisting of gold, copper, iron and manganese in the liquid phase in the presence of substances having a dispersing action.

6. In the production of ethylene oxide by catalytic oxidation of ethylene in the gaseous phase with gases comprising oxygen the step which consists in carrying out the oxidation in the presence of metallic silver catalysts which have been precipitated in the form of non-colloidal metallic particles by reducing silver compounds in the liquid phase in the presence of substances having a dispersing action and which have been superficially etched by treatment with dilute nitric acid.

BRUNO CHRIST.
HEINZ PARDON.
FRITZ HANUSCH.